United States Patent [19]
Liedberg

[11] Patent Number: 5,943,687
[45] Date of Patent: Aug. 24, 1999

[54] PENALTY-BASED CACHE STORAGE AND REPLACEMENT TECHNIQUES

[75] Inventor: N Per Å Liedberg, Tyresö, Sweden

[73] Assignee: Telefonakiebolaget LM Ericsson, Stockholm, Sweden

[21] Appl. No.: 08/818,340

[22] Filed: Mar. 14, 1997

[51] Int. Cl.⁶ .................................................. G06F 13/18
[52] U.S. Cl. ........................... 711/156; 711/133; 711/135
[58] Field of Search .................................... 711/118, 133, 711/134, 135, 136, 156

[56] References Cited

U.S. PATENT DOCUMENTS

| | | | |
|---|---|---|---|
| 5,546,559 | 8/1996 | Kyushima | 711/133 |
| 5,555,393 | 9/1996 | Tanaka | 711/133 |
| 5,649,137 | 7/1997 | Favor | 395/383 |
| 5,671,444 | 9/1997 | Akkary | 395/872 |
| 5,696,932 | 12/1997 | Smith | 711/118 |
| 5,774,685 | 6/1998 | Dubey | 395/381 |
| 5,787,471 | 7/1998 | Inoue | 711/133 |

OTHER PUBLICATIONS

"PowerPC 604, RISC Microprocessor User's Manual", pp. 1–3 and 1–7, published by Motorola Inc. in Nov. 1994.
David A. Patterson, et al., "Computer Architecture a Quantitative Approach", Second Edition, Morgan Kaufmann Publishers, Inc., pp. 374–385, published in 1990.
William Johnson, "Superscaler Microprocessor Design", P T R Prentice–Hall Inc., 1991, pp. 18–21.
"Algorithm for Instruction Cache Arbitration Among Multiple Instruction Streams," IBM Technical Disclosure Bulletin, vol. 39, No. 8, Aug. 1996, pp. 113–116.
D. K. Chia, et al., "Replacement Algorithm using Priority Class Structure," IBM Technical Disclosure Bulletin, vol. 15, No. 12, May 1973, pp. 3803–3805.
Jong–Hong Bae, et al., "A Supplementary Scheme for Reducing Cache Access Time," vol. E79–D, No. 4, Apr. 1996, pp. 385–387.

*Primary Examiner*—John W. Cabeca
*Assistant Examiner*—Christopher S. Chow
*Attorney, Agent, or Firm*—Burns, Doane, Swecker & Mathis, L.L.P.

[57] ABSTRACT

Cache data replacement techniques enable improved performance in a computer system having a central processing unit (CPU), a cache memory and a main memory, wherein the cache memory has a plurality of data items stored therein. The cache data replacement techniques include associating a priority value with each of the stored data items, wherein for each data item, the priority value is an estimate of how much CPU stall time will occur if an attempt is made to retrieve the data item from the cache memory when the data item is not stored in the cache memory. When a cache entry must be replaced, the priority values are analyzed to determine a lowest priority value. One of the data items that has the lowest priority value is selected and replaced by a replacement data item. The priority value of a data item may be determined, as a function of how many other instructions have been fetched and stored in a buffer memory between a time interval defined by initiation and completion of retrieval of the data item from the main memory, wherein execution of the other instructions is dependent on completing retrieval of the data item. In other aspects of the invention, the priority values of cache entries may periodically be lowered in order to improve the cache hit ratio, and may also be reinitialized whenever the associated data item is accessed, in order to ensure retention of valuable data items in the data cache.

36 Claims, 7 Drawing Sheets

PENALTY-BASED CACHE STORAGE AND REPLACEMENT TECHNIQUES

BACKGROUND

The present invention relates to cache memories, and more particularly to strategies for selecting data to be replaced in a cache memory.

Processing inside a computer system may be performed by a hardware element called a central processing unit (CPU). Instructions and data for the CPU may be stored in a large, main memory. The operating speed of a CPU (i.e., the time it takes to perform one instruction) is typically very much faster than the access speed of the main memory. Consequently, the CPU may be forced to idly wait for a requested instruction or data item while the main memory cycles through one memory access operation. This idle wait time seriously degrades the effective processing speed of the CPU.

In order to address this problem, a cache memory unit is often designed into the computer system. Cache memories are well-known in the computer arts as being auxiliary memories that provide a buffering capability between a CPU and a main memory. The cache memory is typically designed to run much faster than the main memory, and to be loaded out of the main memory.

Memory devices that run at the speed of the CPU are much more expensive and physically larger than the slower devices that make up the main memory. As a result, the size of a cache memory (as measured by the number of separately addressable storage cells contained within the memory) is much smaller than the size of a main memory. Because the cache memory cannot contain all of the instructions and data stored in the main memory, the CPU occasionally requests a particular instruction or data item that is not presently stored in the cache memory. Such an occurrence is called a "cache miss", and requires that the requested instruction or data item be retrieved from main memory, stored into the cache memory, and then supplied to the CPU. It can be seen, then, that each cache miss has the potential for making the CPU wait for as long (if not longer) than it would if the cache memory were not present.

A technique for reducing the processing speed penalty whenever a data read cache miss occurs is to make instruction execution out-of-order. This means that instructions subsequent to the one that caused the cache miss will continue to execute while the CPU is waiting for the missing data. For this strategy to work, it is necessary that execution of these subsequent instructions not be dependent on the missing data. Execution of instructions that do depend on the missing data must be held in abeyance (e.g., in queues) until the missing data becomes available. When the data does become available, all of the instructions that were dependent on this data are then executed. Out-of-order instruction execution techniques are described in William Johnson, *Superscaler Microprocessor Design,* 1991 (ISBN 0-13-875634-1) which is incorporated herein by reference.

Even if the out-of-order execution strategy is adopted, there will likely be branch instructions in the program whose target location is in some way conditional on the missing data. One strategy for avoiding a long delay in the instruction fetching operation of the CPU is to guess which branch will be taken, and to tentatively continue fetching and executing instructions from the guessed branch. If, when the missing data becomes available, it is found that the guess was correct, then the results of the tentative execution can be made permanent (e.g., by storing results into target memory locations). However, if an incorrect guess was made, then all of the results from instructions executed after the conditional branch instruction must be flushed, and program execution restarted from the correct branch path. A wrong guess, therefore, causes a very high performance penalty.

This strategy can be improved by further including a branch prediction memory that stores statistics on the results of previous conditional branches in order to increase the probability of making a correct guess regarding which is the correct path for a pending conditional branch. Notwithstanding the use of this strategy, there will inevitably be branches that are mispredicted, thereby causing a high performance penalty.

Another factor that influences the effective execution speed of the CPU is the fact that when a cache miss occurs, data (or one or more instructions for the case where data and instructions share the same cache memory) must be removed from the cache memory in order to make room for the missing data item. The strategy for selecting data to be removed from the cache (called a "cache replacement strategy") can also influence the effective execution speed of the CPU because the "cast out" data may be needed at a later time, thereby causing another cache miss.

Existing cache replacement strategies have been based on maximizing the probability that a requested instruction or data item will be successfully located in the cache (called a "cache hit"). One such strategy selects for removal that data item that has been least recently used (LRU) by the executing program. The basis for this approach is the concept of temporal locality: the notion that the probability that the next address to be accessed will be the same as a recently accessed address is higher the sooner the second access occurs with respect to the first.

Other cache replacement strategies are random replacement and first-in-first-out (FIFO).

All of the above cache replacement strategies have as a goal a high cache hit ratio, usually defined as the number of times an attempted cache read is successful at obtaining the data from the cache divided by the total number of attempted cache accesses. (A related measure is the cache miss ratio, usually defined as 1—cache hit ratio.) However, these cache replacement strategies are deficient because they fail to take into account the effects of cache misses, which will inevitably occur.

SUMMARY

It is therefore an object of the present invention to increase the effective execution speed of a CPU by means of improved methods and apparatus for determining which entries in a cache memory should be removed to make room for a replacement cache data item.

The foregoing and other objects are achieved by utilizing a cache data replacement technique in a computer system having a central processing unit (CPU), a cache memory and a main memory, wherein the cache memory has a plurality of data items stored therein. In accordance with one aspect of the invention, the cache data replacement technique includes associating a priority value with each of the stored data items, wherein for each data item, the priority value is an estimate of how much CPU stall time will occur if an attempt is made to retrieve the data item from the cache memory when the data item is not stored in the cache memory.

In another aspect of the invention, the priority value for each of the data items is ascertained by determining how many other instructions have been fetched and stored in a buffer memory between a time interval defined by initiation and completion of retrieval of the data item from the main memory, wherein execution of the other instructions is dependent on completing retrieval of the data item.

In still another aspect of the invention, the step of determining, for each of the data items, how many other instructions have been fetched and stored in the buffer memory between the time interval further comprises adjusting the priority value by an amount based on whether any of the other instructions is a conditional branch instruction.

In yet another aspect of the invention, the step of determining, for each of the data items, how many other instructions have been fetched and stored in the buffer memory between the time interval, further comprises adjusting the priority value by an amount based on whether any of the other instructions is a non-branch instruction.

In another aspect of the invention, when a replacement data item is to be stored into the cache, the cache entry to be replaced is determined by analyzing the priority values to determine a lowest priority value. Then, one of the data items that has the lowest priority value is selected and replaced by the replacement data item.

In yet another aspect of the invention, the hit ratio of the data cache is improved by not requiring that the priority values of associated data items remain static. Instead, each of the priority values is periodically adjusted by a predetermined amount that results in a lower priority value. In this way, even those cache entries having initially high priority values may eventually become candidates for replacement.

In still another aspect of the invention, valuable data entries may be permitted to remain in the data cache indefinitely by adjusting the priority value by a predetermined amount in response to a read access of the associated data item, wherein the adjustment results in a higher priority value. Alternatively, the priority value can be set to an initial value in response to a read access of the associated data item. When combined with the technique of periodically reducing the priority value of data entries, this technique allows valuable cache entries to remain in the data cache so long as they continue to be accessed by the running program, and further allows them to be replaced when they are no longer utilized.

BRIEF DESCRIPTION OF THE DRAWINGS

The above-described and other objects and advantages of the invention will be understood by reading the following detailed description in conjunction with the drawings in which.

DETAILED DESCRIPTION

Figure 1:
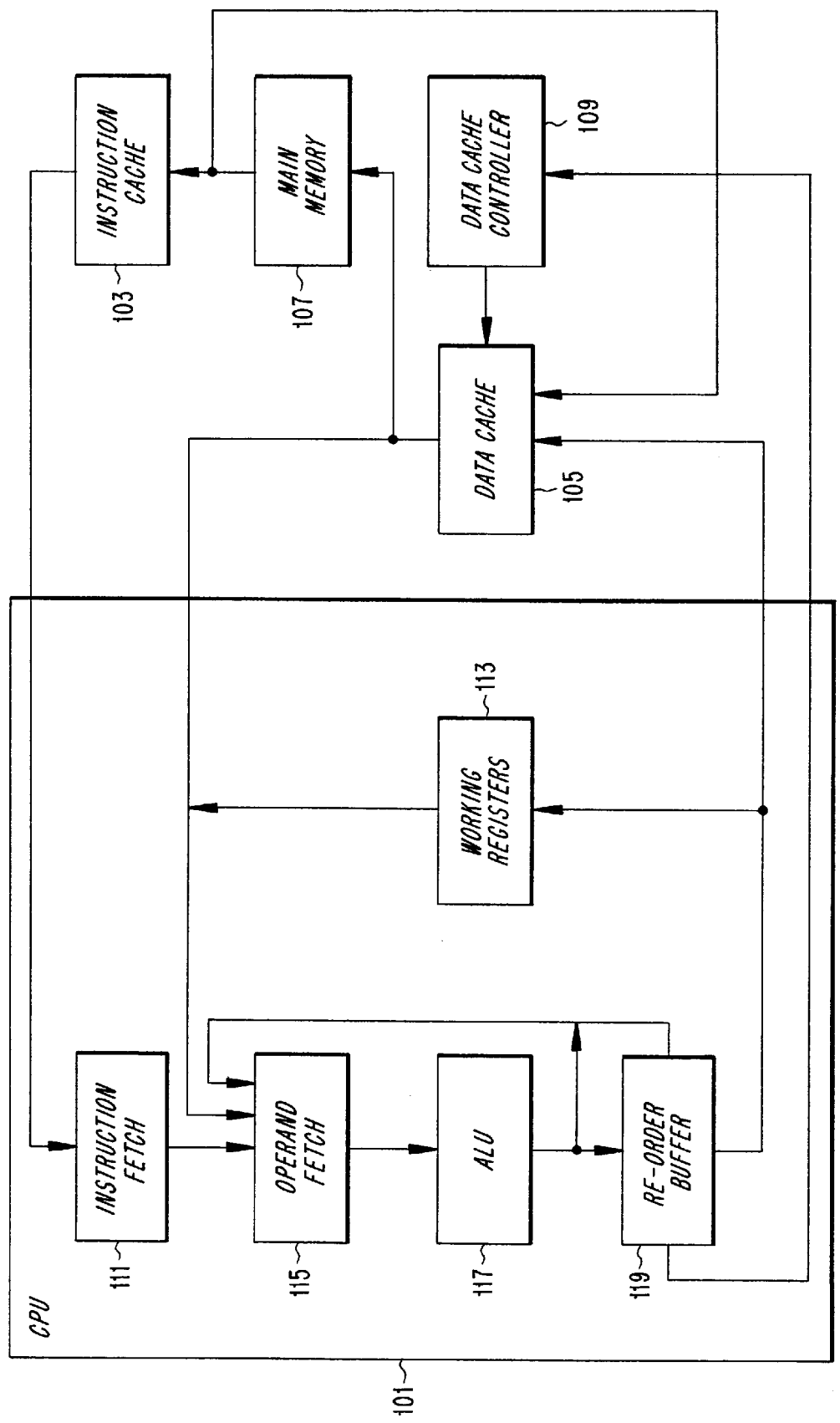
FIG. 1 is a block diagram of an exemplary computer system embodying the invention.

The various features of the invention will now be described with respect to the figures, in which like parts are identified with the same reference characters.

An exemplary computer system embodying the invention is shown in FIG. 1. A CPU 101 executes instructions which are stored in a main memory 107. The CPU 101 retrieves data for the instructions from an address space contained in the main memory 107. Results from instruction execution are also stored back into this same address space.

The cycle time of the main memory 107 is much slower than the execution speed of the CPU 101. In order to more quickly feed the CPU 101 with instructions, an instruction cache 103 is interposed between the CPU 101 and the main memory 107. The instruction cache 103 operates in accordance with conventional techniques, and is therefore not described here in further detail.

In order to allow the CPU 101 to more quickly retrieve and store data, a data cache 105 is also interposed between the CPU 101 and the main memory 107. The flow of data into and out of the data cache 105 is directed by a data cache controller 109. Much of the operation of the data cache 105 is in accordance with known techniques. Like a conventional cache memory, the data cache 105 is a memory whose cycle time is close to the execution speed of the CPU. Also like a conventional cache memory, the data cache 105 only holds a subset of the information that is contained in the main memory 107. Consequently, the issue of cache misses, as discussed in the BACKGROUND section, is applicable to the data cache 105.

In order to mitigate the effect of cache misses, the architecture of the CPU 101 is capable of performing out-of-order execution of instructions, as described in the BACKGROUND section. Techniques for designing a CPU having this capability are known in the art, and need not be described here in great detail. In order to facilitate an understanding of the invention, a short description of an exemplary embodiment of the CPU 101 follows. It should be understood that the inventive principles described here do not require that the CPU 101 take on the particular form described below, but can instead be applied to any processor architecture that employs out-of-order execution of instructions.

The exemplary CPU 101 includes instruction fetch logic 111 for determining the address of a next instruction and for fetching that instruction. The instruction set of the exemplary CPU 101 is designed to utilize operands that are stored in any of a number of addressable working registers 113. Therefore, before an instruction utilizing a source operand can be carried out, that operand must first be loaded into the working register from the data cache 105 by way of operand fetch logic 115, an arithmetic logic unit (ALU) 117, and a re-order buffer 119. Of course, the invention is by no means limited to use only in reduced instruction set computers (RISC) such as the one described here. To the contrary, it may easily be applied to complex instruction set computers (CISC) in which, among other differences, instructions are provided which allow the ALU to operate on data received directly from an addressed memory location without having to first load that data into a working register.

Together, the operand fetch logic 115 and the re-order buffer 119 provide out-of-order execution capability. The operand fetch logic 115 is responsible for assembling source operands which are to be applied to respective inputs of the ALU 117. To facilitate this task, the operand fetch logic 115 includes a number of reservation stations for storing either the source data itself or a sequence number (assigned to the as-yet-unexecuted instruction) which indicates that the source data has not yet been loaded into the working register 113.

The re-order buffer 119 is responsible for assembling destination data, and for keeping track of whether or not a given instruction has been executed, as well as dependencies between instructions. Thus, when an instruction is received, it is assigned a tag number and put into the re-order buffer 119. All previously stored instructions in the re-order buffer 119 are then examined to determine whether any of the sources of the new instruction match the destinations of any other of the previous instructions. If there is a match, then there is a dependency which prevents the new instruction from being immediately executed (i.e., the new instruction requires a source operand that has not yet been generated by an earlier instruction). As a result, the sequence number of the new instruction would be placed in the operand fetch logic 115 instead of the source data itself.

In this embodiment, the re-order buffer 119 has space for storing the destination data itself. Consequently, when the destination data becomes available, it is loaded into the re-order buffer 119, and an associated status flag is set to indicate that the data is valid. In order to speed up instruction execution when the destination data is also source data of a subsequent instruction, the destination data may be routed directly from the re-order buffer 119 to the appropriate reservation station in the operand fetch logic 115, rather than requiring that the data first be written to the working register 113 and then moving the data from the working register 113 to the operand fetch logic 115. To speed instruction execution even further, the exemplary CPU 101 further includes a path from the output of the ALU 117 to the input of the operand fetch logic 115, in order to permit newly generated source data to be loaded even sooner.

The fact that generated data has been stored into the re-order buffer 119 is transparent to the executing program, which is only concerned with storing results into one of the working registers 113 or into the data cache 105 (or main memory 107). Consequently, the data must eventually be moved from the re-order buffer 119 into the destination indicated by the corresponding instruction. The act of moving generated data from the re-order buffer 119 to the appropriate destination is called "committing", "retiring" or "writing-back" the data. The architecture of the exemplary CPU 101 adopts the strategy of committing generated data only after all of the data associated with earlier instructions have been committed.

Despite the inclusion of out-of-order execution capability, the occurrence of a data cache miss still imposes an overhead penalty which slows the effective execution speed of the CPU. 101. Therefore, in order to further increase the effective execution speed of the CPU 101, the data cache controller 109 additionally employs the below-described inventive data replacement techniques whenever a cache miss occurs. Rather than focussing on achieving a high hit ratio, the inventive cache replacement policy is based on reducing the execution speed penalty that will result when data misses occur.

In one aspect of the invention, this objective is achieved by recognizing that data may be classified as one of three categories:

Type-1 data may be pure information that is simply written back to an address without being used as an input variable for calculation of any other data item. An example of a type-1 data item is data that is retrieved from memory as part of an editor's copy and paste operation. Another example of a type-1 data item is a parameter associated with a procedure written in C without using pointers to the variables. In such a case, invocation of the procedure will cause the variable to be copied first to the stack, and then to a local variable with the same contents.

Type-2 data may be information data. This data is used as an input variable for calculation in a certain number of instructions before being written back to an address.

Type-3 data may be control data. Control data either directly or indirectly determines the operation of a conditional branch instruction. (Control data operates indirectly when it is used as an input variable in any number of calculation instructions for determining a resultant data item which is then used as the predicate for determining the operation of a conditional branch instruction.)

In the event of a cache miss, the type-1 data results in almost no execution speed penalty so long as the CPU 101 is provided with hardware that allows out-of-order execution. For this purpose, the queues for holding pending instructions and data should be long enough to keep the execution units in the CPU 101 occupied while the missing data is being retrieved.

There is a greater execution speed penalty resulting from a cache miss associated with type-2 data, and the extent of this penalty is a function of how many instructions depend, either directly or indirectly, on the missing data. (Indirect dependence occurs when an instruction requires, as an input, not the missing data itself, but rather the result of a computation that is a function of the missing data.)

In theory, it is possible to utilize an out-of-order execution strategy when a cache miss involves type-2 data. However, in practice, designing a queue that is long enough to hold pending instructions and data is problematic because the number of dependent instructions that need to remain pending might be very large.

The biggest performance problem occurs with respect to cache misses involving type-3 data. If a conditional branch cannot be evaluated, then the CPU 101 does not know which instructions to fetch. In the worst case, the instruction that is actually needed is not available in the instruction cache 103. As a result, the CPU 101 will stall during the instruction fetch, thereby severely hurting the effective execution speed.

In accordance with one aspect of the invention, the cache replacement policy is designed first to maximize the presence of type-3 data items in the data cache 105. In another aspect of the invention, the cache replacement policy gives type-2 data items priority over type-1 data items in the data cache 105.

A data item's cache replacement priority is provided by associating that data item with a priority value. For example, priority values may be defined such that the higher the value, the higher the cache miss penalty. Of course, one may easily come up with alternative definitions that are nonetheless in accordance with the inventive principles taught here, such as by letting lower priority values indicate a higher cache miss penalty.

Figure 2:
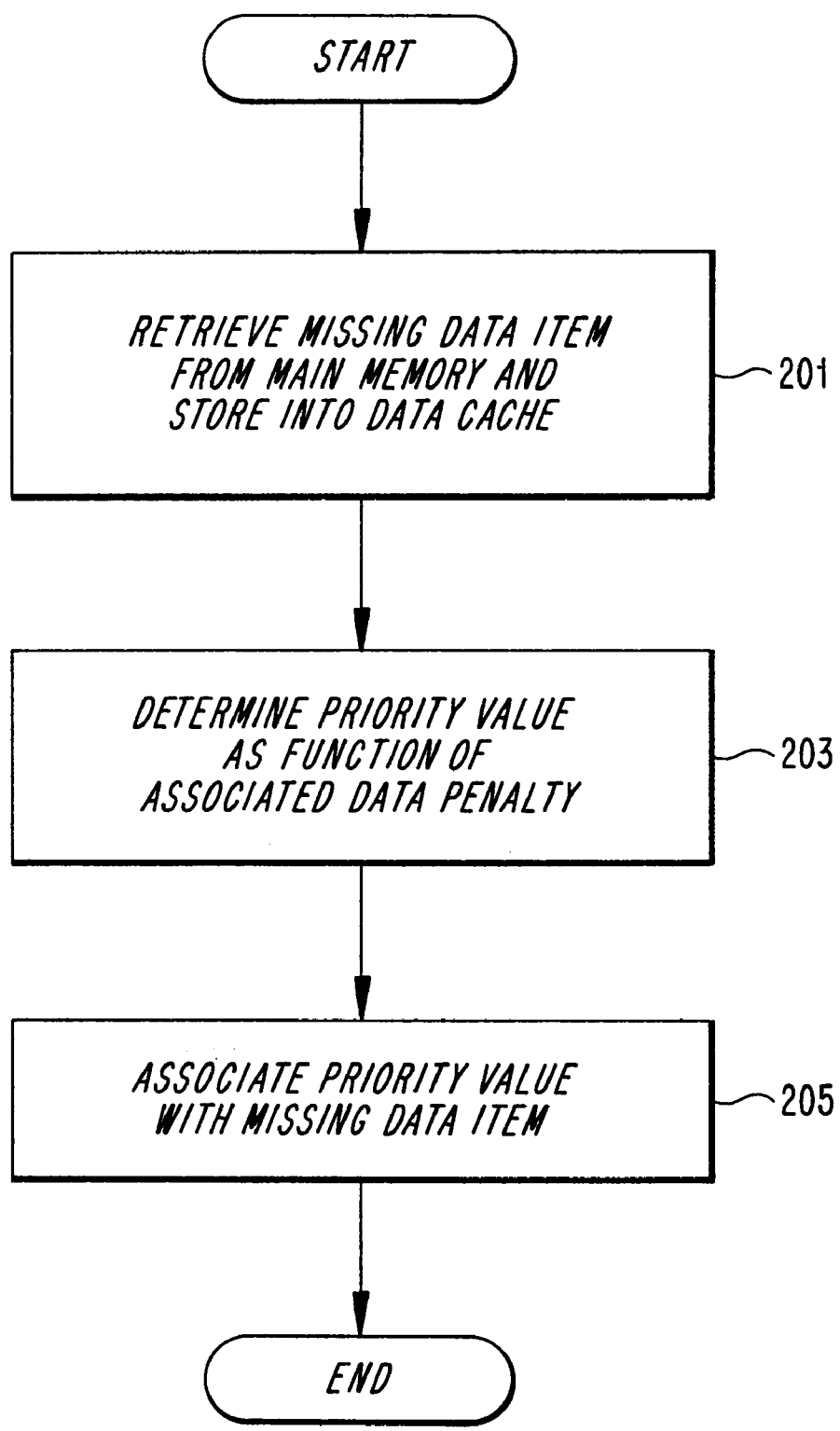
FIG. 2 is a flow chart that depicts a technique for retrieving a data item from main memory and storing it into a data cache in accordance with one aspect of the invention.

An exemplary embodiment of these aspects of the invention will now be described with reference to the flow chart depicted in FIG. 2. Whenever a data cache miss occurs, the missing data item is retrieved from the main memory 107 and stored into the data cache 105 (step 201). Next, an initial priority value is determined as a function of the penalty that would result if this data item were not present in the data cache 105 at the time that an attempt were made to access it (step 203). The priority value is preferably a function of the present status of queues and other hardware resources in the computer. The adjusted value is then associated with the data item (step 205).

The determination of an initial priority value (step 203) will now be described in greater detail. The priority value of a data item is preferably determined when an attempted access of that data item results in a cache miss. When a cache miss occurs, out-of-order execution of subsequent instructions begins. When instructions are encountered that require the presence of the missing data item, those instructions are stored in a queue until they can be executed. For example, consider the following program segment:

load r1, #1; (r1:="address 1")

add r2, r1, r3; (r2:=r1+r3)

add r4, r2, r5; (r4:=r2+r5)

In the above example, not only is the initial load instruction dependent on the presence of the data item at address 1 in the data cache 105, but also the subsequent two add instructions. This is because the first add instruction requires that r1 have the appropriate value in it, which happens only after the initial load instruction is executed. Similarly, the second add instruction cannot be executed until the contents of r2 are determined. Consequently, in the event of a cache miss associated with "address 1" in the data cache 105, all three of the above instructions will be stored in a queue until the missing data becomes available.

The queue in which instructions are stored is used to determine the priority value of the missing data. If there are dependent conditional branches, then the priority value is very high. If there are data dependencies as in the above example, then the priority value can be set to a medium level. If there are not dependencies, then the priority value of the missing data is low. The priority values might, therefore, be set to 3, 2 and 1, respectively.

A simple approach to determining a priority value is to assume that all executing instructions are directly or indirectly dependent on the missing data. The value in this case is $V = N1 \times V1 + N2 \times V2$, where N1 is the number of non-branch instructions that have not yet been executed, V1 is the penalty value assigned to non-branch instructions, N2 is the number of conditional branches that have not yet been executed, and V2 is the penalty value assigned to conditional branch instructions.

It will be observed that the simple approach described above may result in overly high priority values if some or all of the non-executed instructions are dependent only on a data item other than the one for which the penalty value is being calculated. Also, if there are two data fetches in a code segment, each one resulting in a cache miss, the simple priority value calculation approach will result in high priority values being assigned to each, even if the first data item should accurately have a low priority value and the second data item should have a high priority value.

In view of the possibility for overestimating priority values under some circumstances, one might perform a more sophisticated analysis of the contents of the instruction buffers in the re-order buffer in order to count only those non-executed instructions that actually have a dependence on the subject data item. However, the overhead associated with this analysis makes it less attractive than the simple approach described above.

Looking now at a more complete example of a priority value calculation, suppose the following code segment is to be executed by the CPU 101:

| Instruction | Comment |
|---|---|
| load r0, #5; | (r0 := "address 5") |
| jump_on_equal r0, r1; | (jump if r0 = r1) |
| add r6, r3, r0; | (r6 := r3 + r0) |
| add r7, r3, r2; | (r7 := r3 + r2) |
| add r8, r7, r9; | (r8 := r7 + r9) |
| add r9, r10, r11; | (r9 := r10, r11) | where $r_x$ represents working register x.

After these instructions are fetched, the contents of the re-order buffer 119 might look as in Table 1:

TABLE 1

| Pos | Seq no | opcode | dest | data | data valid | occupied |
|---|---|---|---|---|---|---|
| 7 | | | | | | 0 |
| 6 | | | | | | 0 |
| 5 | 12 | add | r9 | 1234 | 1 | 1 |
| 4 | 11 | add | r8 | 2344 | 1 | 1 |
| 3 | 10 | add | r7 | 2342 | 1 | 1 |
| 2 | 9 | add | r6 | — | 0 | 1 |
| 1 | 8 | je | — | — | 0 | 1 |
| 0 | 7 | load | r0 | — | 0 | 1 |

Suppose the "load r0, #5" resulted in a cache miss, thereby requiring that the desired data be fetched from main memory 107. Then, by the time the data from memory address 5 arrives there are one conditional jump (at position 1) and one add (at position 2) which are dependent on the newly arriving data. The "data valid=1" located at positions 3, 4 and 5 indicates that those add instructions have been executed, and are not dependent on any other instructions. If the penalty for conditional jumps is 5 (i.e., V2=5) and for other instructions is 1 (i.e., V1=1), then the total priority value that will be assigned to the address 5 data will be 1×5+1×1=6.

Note that, in this case, all of the instructions after the conditional jump instruction were speculatively fetched and executed based on the predicted jump result being jump not taken. If the jump result is mispredicted, then all of the instructions after the conditional jump must be flushed, and the correct instruction path fetched and executed.

Figure 3:
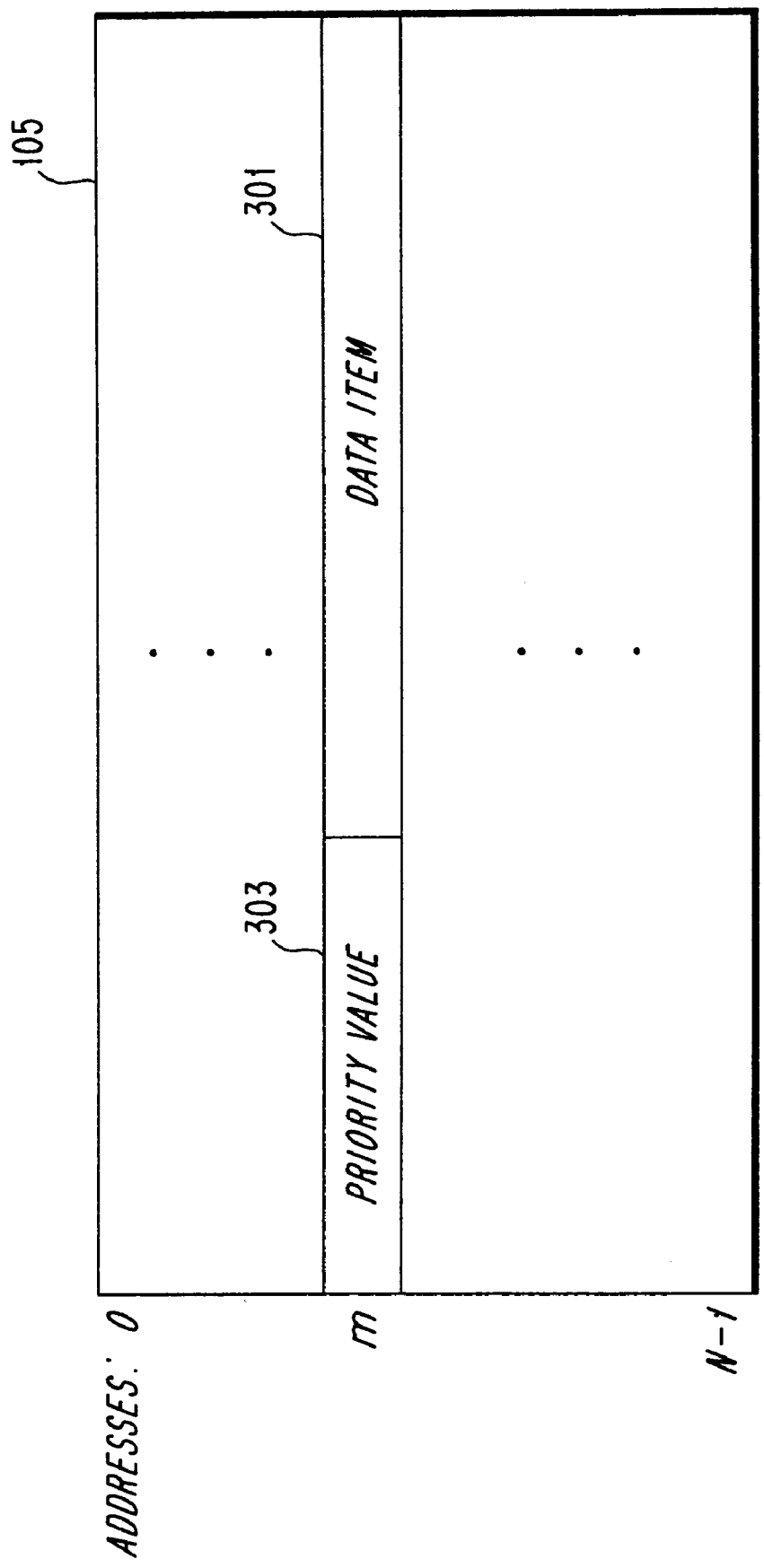
FIG. 3 is a diagram of an exemplary embodiment of a data cache for use with the inventive cache storage and replacement techniques.

Techniques for determining a priority value for each data cache entry have been described. As indicated in FIG. 2, it is necessary to associate the priority value with the cache entry. This may be done in any of a variety of ways. One of these will now be described with reference to FIG. 3, which depicts an exemplary embodiment of a data cache 105 for use with the above-described inventive techniques is shown. The data cache 105 is capable of storing N data items at addresses designated from 0 to N-1. At an exemplary address, m, a data item 301 is stored. The data cache 105 is constructed such that for each location that stores a data item, there is a corresponding location for storing an associated priority value. Thus, for the exemplary location m, the stored data item 301 is associated with a stored priority value 303. Techniques for constructing a cache memory having this capability are well-known in the art, and are not described here in greater detail. See, for example, John L. Hennes, *Computer Architecture, A Quantitative Approach*, (1990) which is hereby incorporated herein by reference.

Figure 4:
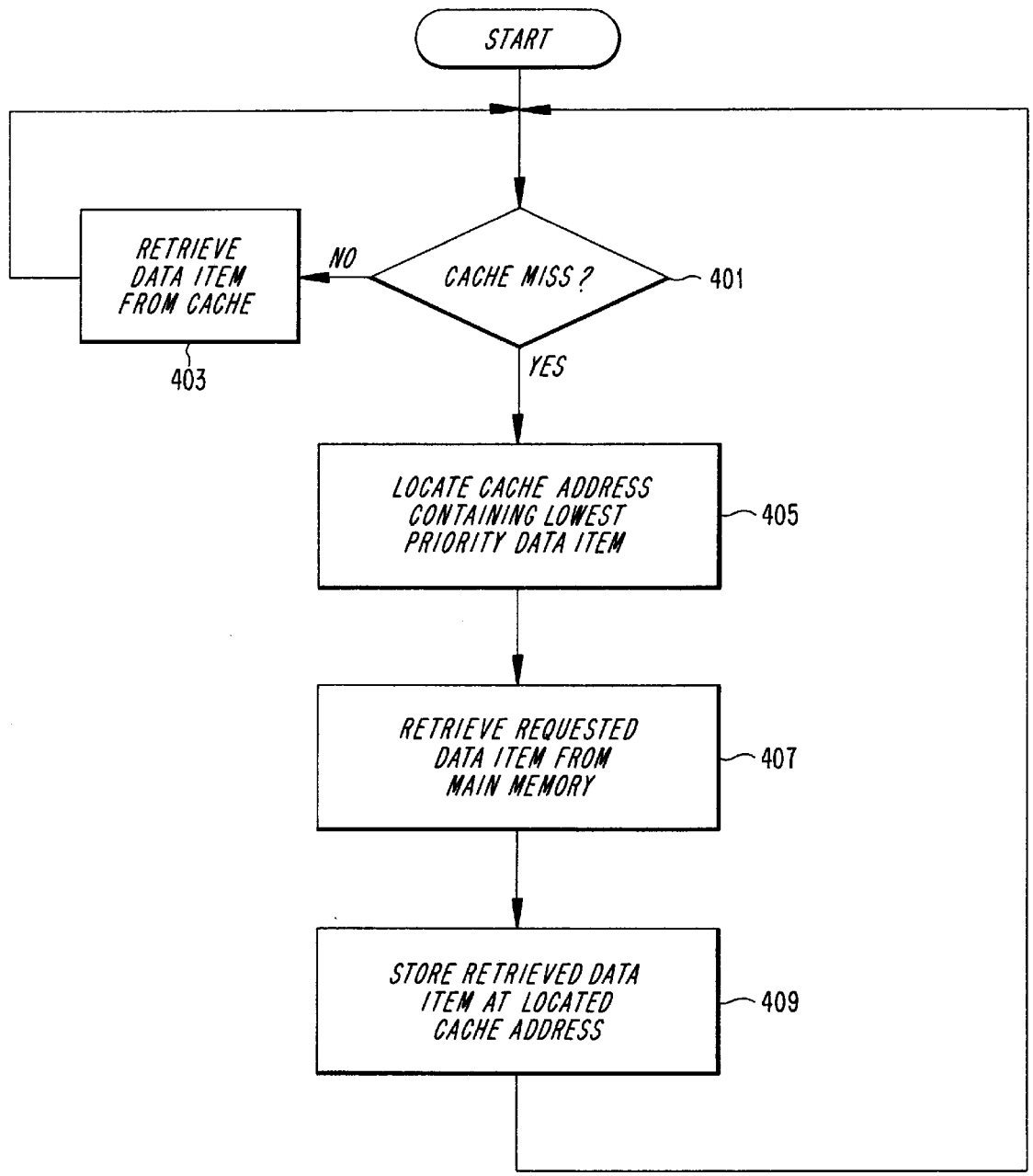
FIG. 4 is a flow chart that depicts a strategy for replacing data in a cache memory in accordance with another aspect of the invention.

In another aspect of the invention, a strategy for replacing data in a cache memory will now be described with respect to the flow chart of FIG. 4. In this exemplary embodiment, it is assumed that each entry in a data cache 105 has an associated priority value as described above.

When an attempt is made to read an entry from the data cache 105, a determination is made regarding whether the requested data item is presently stored in the data cache 105 (decision block 401). If the item is found ("no" path out of decision block 401), then the item is simply retrieved from the data cache 105 (step 403), and processing continues.

If a cache miss occurs ("yes" path out of decision block 401), then it is necessary to remove an entry from the data cache 105 in order to make room for the requested data item. This is accomplished by locating an entry having a priority value that is lowest among all of the priority values 303 stored in the data cache 105 (step 405). In the event that more than one entry has a lowest priority value, any technique may be used for deciding which one to remove from the data cache 105: random selection, use of a pointer, or any other technique. Then, the requested (i.e., "missing") data item is retrieved from the main memory 107 (step 407), and the retrieved data item is stored into the data cache 105 at the address that was identified in step 405. By removing an entry having a lowest priority value, the inventive cache replacement strategy reduces the likelihood that a subsequent cache miss associated with the removed entry will occur (i.e., the priority value was low because the removed data item had not been accessed for a long time), or alternatively makes it less likely that a subsequent cache miss associated with the removed entry will result in any substantial execution speed penalty (i.e., because out-of-order execution of subsequent instructions can proceed while waiting for retrieval of the requested data item from main memory 107).

The above-described data cache replacement strategy, including the determination of priority values for each cache entry, increases the likelihood that the data in the cache will be the kind of data that would cause a substantial execution speed penalty if it had to be retrieved from the main memory 107. That is, if relative priority values are 1, 2 and 3 for Type-1, -2, and -3 data, respectively, it is more likely that Type-3 data will be in the cache because the Type-1 and Type-2 are more likely to be replaced. However, the above-described strategy creates the possibility that a data item will stay in the data cache 105 indefinitely, even if that data item is never used again by the CPU 101. This is because so long as there is a lower-priority cache entry, such a data item will never be replaced in the data cache 105. The presence of such a cache entry (i.e., one that is never replaced even though it is never again required as a source operand) is undesirable because it reduces the cache hit/miss ratio.

This problem is addressed in yet another aspect of the invention, by allowing the priority value to further be a function of how much time has passed since the data item was last accessed. In this way, the principle of temporal locality may also be employed to increase the hit ratio of the cache, while still giving preference to data types having higher execution speed penalties. In an exemplary embodiment, the priority value 303 of each cache entry is decremented by a predetermined amount every T seconds. As a result, even those cache entries having initially-high priority values will eventually have low-enough priority values to make them contenders for replacement when a new cache entry is to be stored.

In yet another aspect of the invention, the strategy in which priority values are periodically decremented is supplemented by re-initializing or alternatively incrementing the priority value 303 whenever the cache entry is accessed. In one embodiment, the priority value 303 may be increased by the associated penalty value whenever the cache entry is accessed. In this way, the priority value takes into account not only the cost of one cache miss, but also the frequency with which this data entry is accessed. For example, assume that a first data item costs only one clock cycle of CPU stall time in the event of a cache miss, and that this data item is accessed ten times as frequently as a second data item costing ten clock cycles of CPU stall time in the event of a cache miss. In this case, the value of the first data item is equal to the value of the second data item. Thus, by reinitializing or incrementing the priority value every time a data item is accessed, the replacement strategy takes into account the effect of frequent access.

Figure 5:
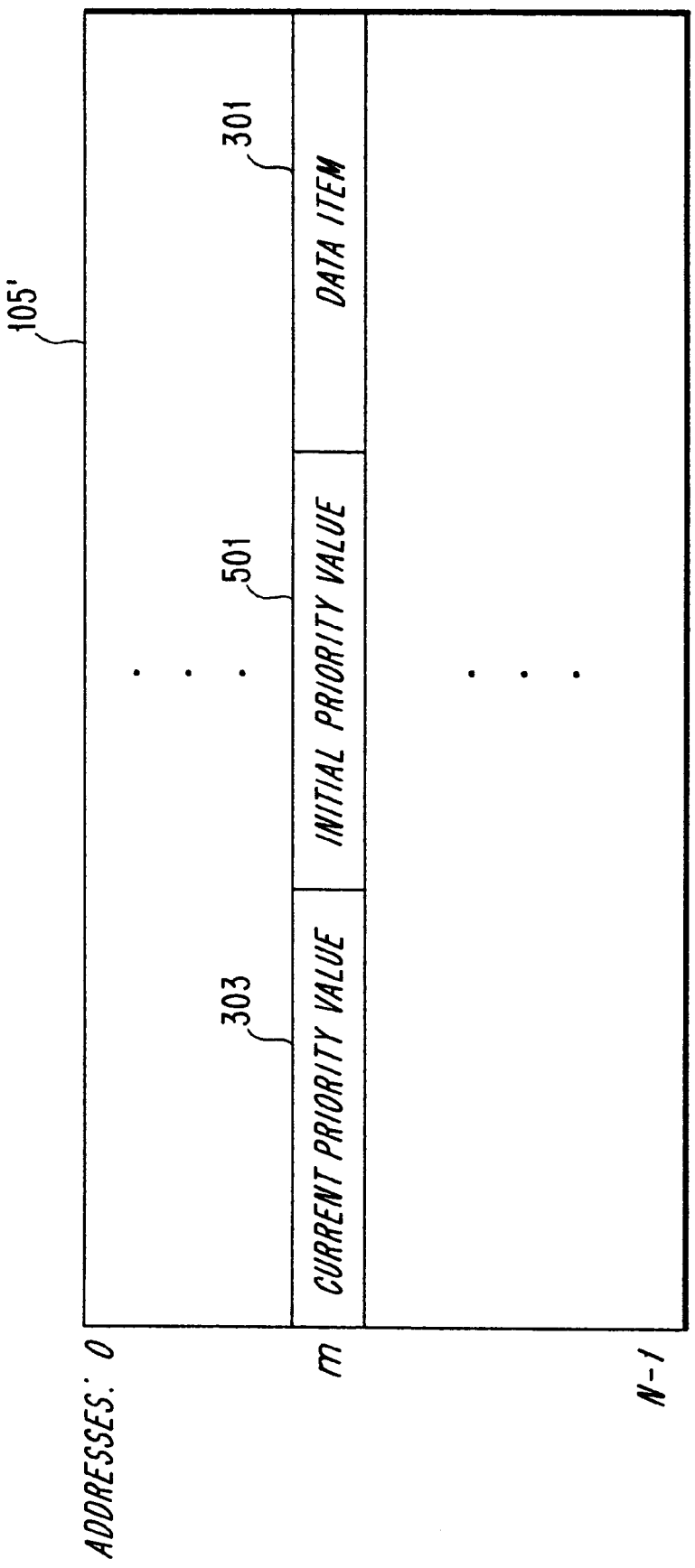
FIGS. 5 and 6 are diagrams of an alternative exemplary embodiments of a data cache for use with the inventive cache storage and replacement techniques.

If the strategy is employed in which the priority value 303 is reinitialized with every access of the cache entry, it is necessary to keep track not only of the current priority value 303 for each cache entry, but also the initial priority value. This may be accomplished by organizing a data cache 105' as shown in FIG. 5. The data cache 105' is substantially identical to the data cache 105 shown in FIG. 3 except for the addition of an initial priority value field 501 associated with each cache entry.

The discussion will now focus on the determination of relative penalty values (i.e., V1 and V2) for different kinds of instructions. Suppose a cache miss resulting from an attempt to retrieve a first data item results in ten clock cycles of CPU stall time, and that a cache miss resulting from an attempt to retrieve a second data item causes only one clock cycle of CPU stall time because of the possibility of out-of-order execution. It follows that, given a choice between the two, the first data item should be retained in the data cache 105 rather than the second data item in order to avoid an expensive cache miss. In this sense, the first data item is more "valuable" than the second data item.

Consider a third data item that, because of very effective out-of-order execution, does not cause any CPU stall time when a cache miss occurs. Such a data item need not be stored in the data cache at all; that is, the third data item has little, if any, value.

In view of the above, it can be stated that the more valuable a data item is, the longer it should be retained in the data cache 105. A good rule of thumb is to retain a data item in proportion to its value. For example, the first data item costing ten clock cycles of CPU stall time in the event of a cache miss should be retained in the data cache 105 ten times longer than the second data item costing only one clock cycle of CPU stall time (assuming that neither data item is accessed during this time period). This may easily be accomplished by setting the penalty value of the first data item equal to 10 (i.e., V1=10), setting the penalty value of the second data item equal to 1 (i.e., V2=1), determining a priority value 303 for each, as described above, and then adjusting (e.g., decreasing) the magnitude of each priority value at a predetermined frequency, while also reloading the value every time the data item is accessed.

The above discussion of determining penalty values (e.g., V1, V2) is premised on the availability of measurements or estimates of CPU stall times for different types of instructions. In the illustrative embodiment, the penalty values associated with different data types is fixed for each determination of an initial priority value 501. When type-1 or type-2 data items are considered, it is a relatively simple matter to come up with a value that represents an average CPU stall time, because the execution speed of these types of instructions (e.g., load, add, logical AND) is easily determined.

With respect to type-3 data items, however, the task becomes more difficult because the execution speed is a function of whether or not the branch is taken, and whether or not prefetched instructions (based on a prediction of whether or not the branch would be taken) need to be flushed from the instruction cache 103 and new instructions fetched and executed. Those having ordinary skill in the art will recognize that an average penalty value for type-3 data can be determined based on knowledge about the processor speed, the access time to the instruction memory, the cache hit ratio and the relative accuracy of the branch prediction algorithm (e.g., 90% accurate prediction).

In an alternative embodiment, the penalty values associated with different data types may be dynamically determined for each individual data item. With respect to type-1 or type-2 data items, the dynamically determined values will most likely be constant (or nearly constant), since the respective execution speeds of these types of instructions (e.g., load, add, logical AND) do not generally change from time to time. (In some architectures, the execution speed of instructions such as multiply and divide may be somewhat data dependent.)

In this alternative embodiment, the penalty values associated with type-3 data can be dynamically determined by allowing any pending conditional branch instructions to execute after the missing data arrives, and then actually measuring to see what the delay time turns out to be (e.g., seeing whether prefetched instructions need to be flushed because of an inaccurate branch prediction, and if so, how many instructions were flushed). Of course, the overhead associated with this dynamic determination of each penalty value is considerably more than that associated with the use of a fixed estimate of penalty value. Also, determining the penalty value dynamically delays a final determination of initial priority value 501. These factors should be taken into consideration in deciding which approach (i.e., static versus dynamic penalty value determination) should be used for any particular system.

Figure 6:
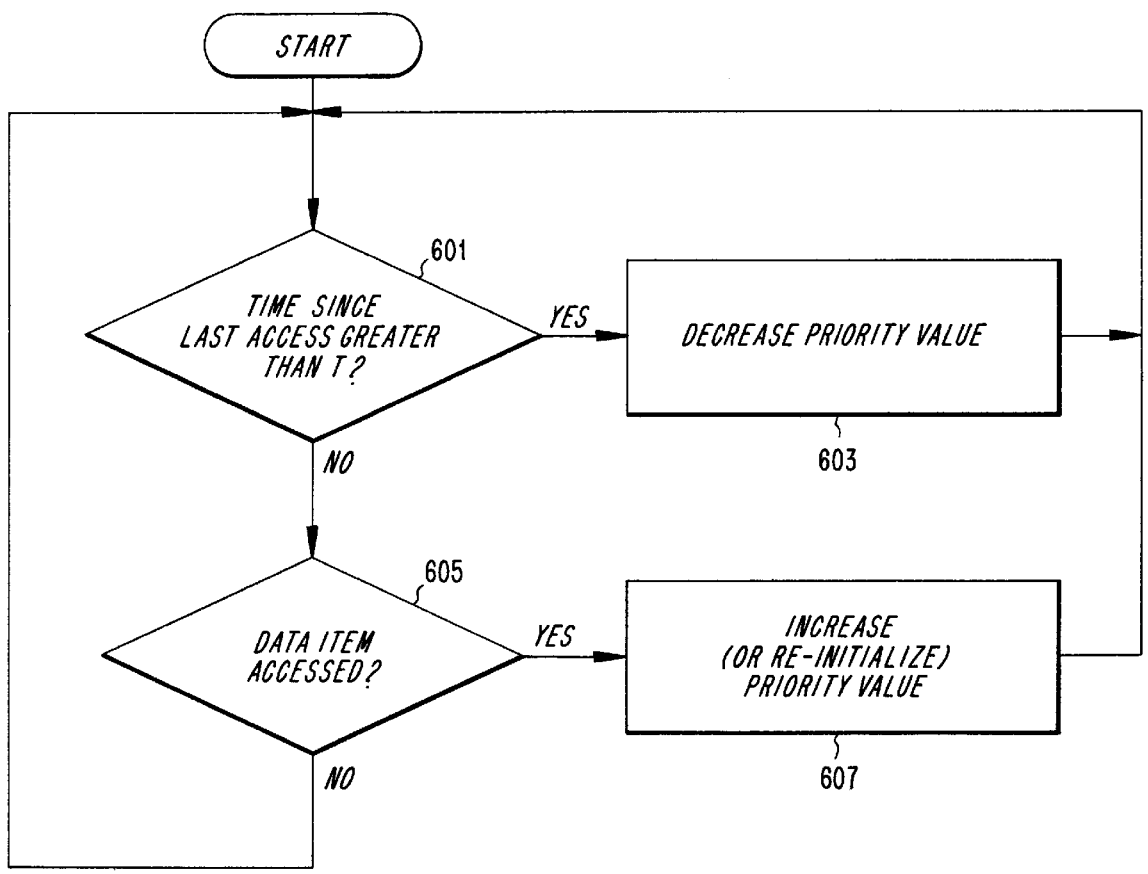

A strategy for maintaining priority values in accordance with the above-described principles will now be described with reference to the flow chart of FIG. 6. It is assumed that a data item (such as the data item 301) and its corresponding current priority value 303 and initial priority value 501 are stored in a data cache 105'. In this example, it is further assumed that higher priority values indicate a higher priority for retaining the data item in the data cache 105'.

The exemplary priority value maintenance strategy employs the principle of temporal locality in order to maintain a high hit ratio in the data cache 105'. Accordingly, if it is determined that it has been more than T seconds since a data item was last accessed ("yes" path out of decision block 601), the priority value that is associated with the data item is decreased by some predetermined amount (step 603). In a preferred embodiment, the predetermined amount is a lowest possible amount, such an amount equal to one.

If it is determined that the data item has been recently accessed ("yes" path out of decision block 605), then its associated priority value is increased or alternatively set to the initial calculated priority value (step 607). The reason for doing this is because the recent access indicates a higher likelihood that this data item will be accessed again in the near future. Consequently, the increase (or reinitialization) of the priority value will help ensure that the data item will not be removed, but instead will remain in the data cache 105' for the near term. In a preferred embodiment, step 607 includes distinguishing between read accesses and write accesses, so that every read access causes the priority value to be increased by the initial calculated priority value (e.g., an amount ranging between one and approximately eight), whereas every write access causes the priority value to be increased by a lowest possible value (e.g, an amount equal to one).

The description so far has been premised on the data cache 105 being controlled in a manner such that each cache miss causes only one data item to be retrieved from the main memory 107 and stored into the data cache 105. However, it is more typical that data caches are designed such that each cache miss causes a number (e.g., 8, 16) of data items (referred to herein as a "cache entry") to be retrieved from the main memory 107 and stored into the data cache 105. The cache entry usually comprises not only the missing data item (i.e., the contents of the main memory address location whose absence in the data cache 105 caused the cache miss), but also those data items whose addresses are near that of the "missing" data item. The rationale for this strategy is to improve the data cache's hit ratio in reliance on a principle known as "spatial locality" (or "locality of reference"). This principle, which is based on observations of how programs are typically designed, asserts that if a memory access presently reads data from, say, location x, then there is an increased probability that a subsequent memory access will attempt to read data from a memory address location that is near location x. Thus, by retrieving a cache entry comprising not only the data item from location x but also those data items stored at locations close to x, it is more likely that a subsequent attempt to access the data cache 105 will result in a cache hit.

Figure 7:
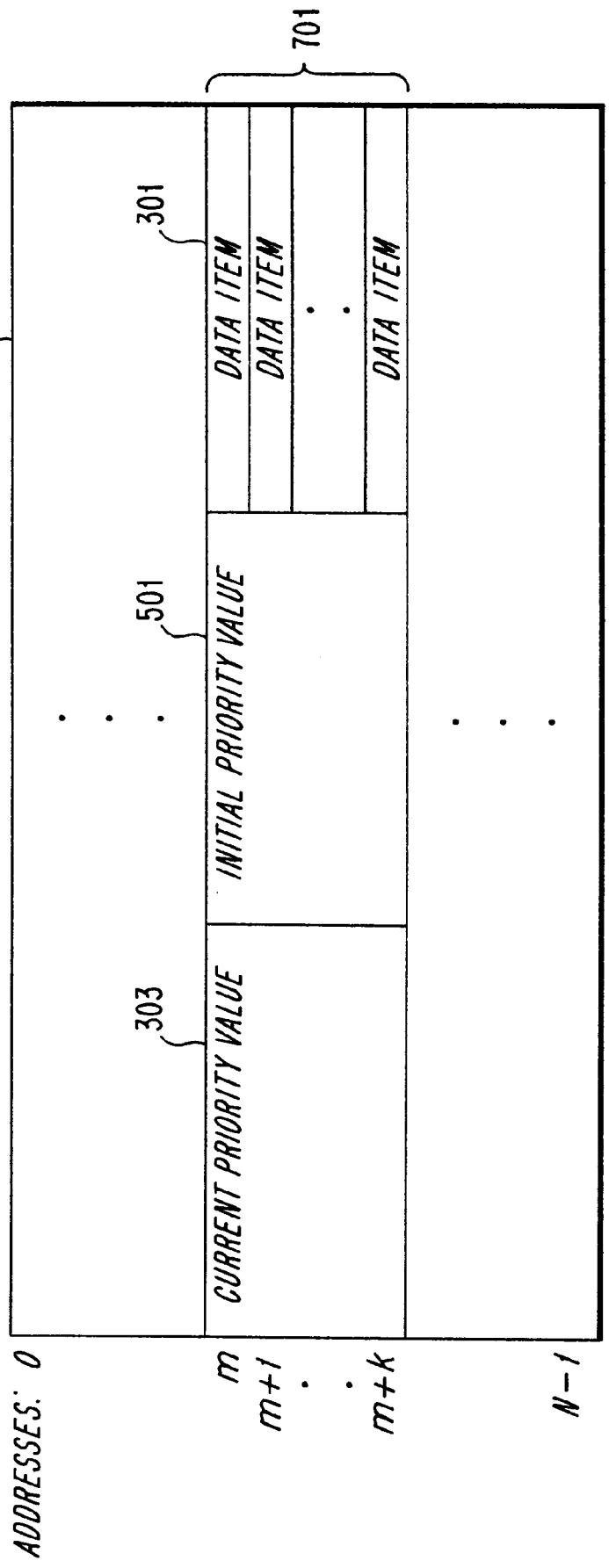
FIG. 7 is a flow chart that depicts a strategy for maintaining priority values in accordance with other aspects of the invention.

In another embodiment, the inventive principles described above are applied to a data cache whose data cache controller 109 retrieves cache entries (as opposed to single data items) whenever a cache miss occurs. An exemplary data cache 105" adapted for this purpose is shown in FIG. 7. The current priority value 303 and initial priority value 501 are determined and utilized in the same manner as described above. The difference between the data cache 105" and previously described embodiments lies in the fact that each pair of current priority value 303 and initial priority value 501 is associated with an entire cache entry 701, rather than being uniquely associated with just one data item 301. Determination of the initial priority value 501 is based on whichever one of the data items 301 in the cache entry 701 caused the cache miss to occur, thereby causing the cache entry 701 to be retrieved from the main memory 107. An assumption is made that other data items 301 in the cache entry 701 are of a similar data type, and so would have similar priority values. In another aspect of this embodiment, whenever any of the data items 301 in the cache entry 701 is accessed, the value of the associated current priority value 303 may be adjusted (e.g., reinitialized or increased) as described above with respect to FIG. 6. In yet another aspect of the invention, the current priority value 303 may be adjusted to a value indicating lower priority if none of the data items 301 in the cache entry 701 have been accessed during any particular period of time. In all other respects, the principles involved with this embodiment are the same as those described above, and therefore need not be described again.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a computer system having a central processing unit (CPU), a cache memory and a main memory, a method of storing a data item into the cache memory comprising the steps of:

initiating retrieval of the data item from the main memory in response to at least partial execution of a first instruction;

determining a priority value to be associated with the data item, wherein the priority value is an estimate of how much CPU stall time will occur if an attempt is made to retrieve the data item from the cache memory when the data item is not stored in the cache memory; and completing retrieval of the data item and storing both the data item and the priority value in the cache memory, wherein the CPU stall time is attributable to one or more fetched instructions that cannot be executed due to data dependencies on the data item.

2. The method of claim 1, wherein the step of determining the priority value occurs after retrieval of the data item has been completed.

3. The method of claim 1, wherein the data item is information data for use as an input variable for calculation in at least one instruction.

4. The method of claim 1, wherein the data item is control data for use in directly or indirectly determining a result of a conditional branch instruction.

5. In a computer system having a central processing unit (CPU), a cache memory and a main memory, a method of storing a data item into the cache memory comprising the steps of:

initiating retrieval of the data item from the main memory in response to at least partial execution of a first instruction;

determining a priority value to be associated with the data item, wherein the priority value is an estimate of how much CPU stall time will occur if an attempt is made to retrieve the data item from the cache memory when the data item is not stored in the cache memory; and completing retrieval of the data item and storing both the data item and the priority value in the cache memory, wherein the step of determining the priority value comprises determining how many other instructions have been fetched and stored in a buffer memory between the time of initiating retrieval of the data item and completing retrieval of the data item, wherein execution of the other instructions is dependent on completing retrieval of the data item.

6. The method of claim 5, wherein the step of determining the priority value further comprises adjusting the priority value by an amount based on whether any of the other instructions is a conditional branch instruction.

7. The method of claim 5, wherein the step of determining the priority value further comprises adjusting the priority value by an amount based on whether any of the other instructions is a non-branch instruction.

8. A cache data replacement method for use in a computer system having a central processing unit (CPU), a cache memory and a main memory, wherein the cache memory has a plurality of data items stored therein, the cache data replacement method comprising the steps of:

associating a priority value with each of the stored data items, wherein for each data item, the priority value is an estimate of how much CPU stall time will occur if an attempt is made to retrieve the data item from the cache memory when the data item is not stored in the cache memory;

analyzing the priority values to determine a lowest priority value;

selecting one of the data items that has the lowest priority value; and replacing the selected data item with a replacement data item, wherein the CPU stall time is attributable to one or more fetched instructions that cannot be executed due to data dependencies on the data item.

9. The cache data replacement method of claim 8, further comprising the step of:

periodically adjusting each of the priority values by a predetermined amount that results in lower priority value.

10. The cache data replacement method of claim 8, further comprising the step of:

for each of the priority values, adjusting the priority value by a first predetermined amount in response to a read access of the associated data item, wherein the adjustment results in a higher priority value.

11. The cache data replacement method of claim 10, further comprising the step of:

for each of the priority values, adjusting the priority value by a second predetermined amount in response to a write access of the associated data item, wherein the adjustment results in a higher priority value.

12. The cache data replacement method of claim 11, wherein adjustment by the first predetermined amount results in a higher priority value than adjustment by the second predetermined amount.

13. The cache data replacement method of claim 8, further comprising the step of:

for each of the priority values, setting the priority value to an inital priority value in response to a read access of the associated data item.

14. The cache data replacement method of claim 8, wherein the data item is information data for use as an input variable for calculation in at least one instruction.

15. The cache data replacement method of claim 8, wherein the data item is control data for use in directly or indirectly determining a result of a conditional branch instruction.

16. A cache data replacement method for use in a computer system having a central processing unit (CPU), a cache memory and a main memory, wherein the cache memory has a plurality of data items stored therein, the cache data replacement method comprising the steps of:

associating a priority value with each of the stored data items, wherein for each data item, the priority value is an estimate of how much CPU stall time will occur if an attempt is made to retrieve the data item from the cache memory when the data item is not stored in the cache memory:

analyzing the priority values to determine a lowest priority value;

selecting one of the data items that has the lowest priority value; and replacing the selected data item with a replacement data item, wherein the step of associating a priority value with each of the stored data items comprises the step of determining, for each of the data items, how many other instructions have been fetched and stored in a buffer memory between a time interval defined by initiation and completion of retrieval of the data item from the main memory, wherein execution of the other instructions is dependent on completing retrieval of the data item.

17. The cache data replacement method of claim 16, wherein the step of determining, for each of the data items, how many other instructions have been fetched and stored in the buffer memory between the time interval further comprises adjusting the priority value by an amount based on whether any of the other instructions is a conditional branch instruction.

18. The cache data replacement method of claim 16, wherein the step of determining, for each of the data items, how many other instructions have been fetched and stored in the buffer memory between the time interval, further comprises adjusting the priority value by an amount based on whether any of the other instructions is a non-branch instruction.

19. In a computer system having a central processing unit (CPU), a cache memory and a main memory, an apparatus for storing a data item into the cache memory comprising:
 means for initiating retrieval of the data item from the main memory in response to at least partial execution of a first instruction;
 means for determining a priority value to be associated with the data item, wherein the priority value is an estimate of how much CPU stall time will occur if an attempt is made to retrieve the data item from the cache memory when the data item is not stored in the cache memory; and
 means for completing retrieval of the data item and storing both the data item and the priority value in the cache memory,
 wherein the CPU stall time is attributable to one or more fetched instructions that cannot be executed due to data dependencies on the data item.

20. The apparatus of claim 19, wherein the means for determining the priority value makes the determination after retrieval of the data item has been completed.

21. The apparatus of claim 19, wherein the data item is information data for use as an input variable for calculation in at least one instruction.

22. The apparatus of claim 19, wherein the data item is control data for use in directly or indirectly determining a result of a conditional branch instruction.

23. In a computer system having a central processing unit (CPU), a cache memory and a main memory, an apparatus for storing a data item into the cache memory comprising:
 means for initiating retrieval of the data item from the main memory in response to at least partial execution of a first instruction;
 means for determining a priority value to be associated with the data item, wherein the priority value is an estimate of how much CPU stall time will occur if an attempt is made to retrieve the data item from the cache memory when the data item is not stored in the cache memory; and
 means for completing retrieval of the data item and storing both the data item and the priority value in the cache memory,
 wherein the means for determining the priority value comprises means for determining how many other instructions have been fetched and stored in a buffer memory between the time of initiating retrieval of the data item and completing retrieval of the data item, wherein execution of the other instructions is dependent on completing retrieval of the data item.

24. The apparatus of claim 23, wherein the means for determining the priority value further comprises means for adjusting the priority value by an amount based on whether any of the other instructions is a conditional branch instruction.

25. The apparatus of claim 23, wherein the means for determining the priority value further comprises means for adjusting the priority value by an amount based on whether any of the other instructions is a non-branch instruction.

26. A cache data replacement apparatus for use in a computer system having a central processing unit (CPU), a cache memory and a main memory, wherein the cache memory has a plurality of data items stored therein, the cache data replacement apparatus comprising:
 means for associating a priority value with each of the stored data items, wherein for each data item, the priority value is an estimate of how much CPU stall time will occur if an attempt is made to retrieve the data item from the cache memory when the data item is not stored in the cache memory;
 means for analyzing the priority values to determine a lowest priority value;
 means for selecting one of the data items that has the lowest priority value; and
 means for replacing the selected data item with a replacement data item,
 wherein the CPU stall time is attributable to one or more fetched instructions that cannot be executed due to data dependencies on the data item.

27. The cache data replacement apparatus of claim 26, further comprising:
 means for periodically adjusting each of the priority values by a predetermined amount that results in a lower priority value.

28. The cache data replacement apparatus of claim 26, further comprising:
 means for adjusting the priority value of an associated data item by a first predetermined amount in response to a write access of the associated data item, wherein the adjustment results in a higher priority value.

29. The cache data replacement apparatus of claim 28, further comprising:
 means for adjusting the priority value of an associated data item by a second predetermined amount in response to a write access of the associated data item, wherein the adjustment results in a higher priority value.

30. The cache data replacement apparatus of claim 29, wherein adjustment by the first predetermined amount results in a higher priority value than adjustment by the second predetermined amount.

31. The cache data replacement apparatus of claim 26, further comprising:
 means for setting the priority value of an associated data item to an initial priority value in response to a read access of the associated data item.

32. The cache data replacement apparatus of claim 26, wherein the data item is information data for use as an input variable for calculation in at least one instruction.

33. The cache data replacement apparatus of claim 26, wherein the data item is control data for use in directly or indirectly determining a result of a conditional branch instruction.

34. A cache data replacement apparatus for use in a computer system having a central processing unit (CPU), a cache memory and a main memory, wherein the cache memory has a plurality of data items stored therein, the cache data replacement apparatus comprising:

means for associating a priority value with each of the stored data items, wherein for each data item, the priority value is an estimate of how much CPU stall time will occur if an attempt is made to retrieve the data item from the cache memory when the data item is not stored in the cache memory;

means for analyzing the priority values to determine a lowest priority value;

means for selecting one of the data items that has the lowest priority value; and means for replacing the selected data item with a replacement data item, wherein the means for associating a priority value with each of the stored data items comprises means for determining, for each of the data items, how many other instructions have been fetched and stored in a buffer memory between a time interval defined by initiation and completion of retrieval of the data item from the main memory, wherein execution of the other instructions is dependent on completing retrieval of the data item.

35. The cache data replacement apparatus of claim 34, wherein the means for determining, for each of the data items, how many other instructions have been fetched and stored in the buffer memory between the time interval, further comprises means for adjusting the priority value by an amount based on whether any of the other instructions is a conditional branch instruction.

36. The cache data replacement apparatus of claim 34, wherein the means for determining, for each of the data items, how many other instructions have been fetched and stored in the buffer memory between the time interval, further comprises means for adjusting the priority value by an amount based on whether any of the other instructions is a non-branch instruction.

* * * * *